United States Patent [19]
Kaneff et al.

[11] Patent Number: 5,757,335
[45] Date of Patent: May 26, 1998

[54] DISH ANTENNA STRUCTURES AND HYDRAULIC CONTROL OF THE ORIENTATION THEREOF

[75] Inventors: Stephen Kaneff, Red Hill; Robert Edgar Whelan, O'Connor, both of Australia

[73] Assignee: Anutech PTY. Limited, Australian Capital Territory, Australia

[21] Appl. No.: 436,222

[22] PCT Filed: Nov. 17, 1993

[86] PCT No.: PCT/AU93/00588

§ 371 Date: Jul. 12, 1995

§ 102(e) Date: Jul. 12, 1995

[87] PCT Pub. No.: WO94/11918

PCT Pub. Date: May 26, 1994

[30] Foreign Application Priority Data

Nov. 17, 1992 [AU] Australia ............... PL 5900
Nov. 17, 1992 [AU] Australia ............... PL 5901

[51] Int. Cl.$^6$ ...................... H01Q 3/02
[52] U.S. Cl. ............. 343/882; 343/840; 343/880; 343/915
[58] Field of Search ............. 343/880, 881, 343/882, 840, 912, 915, DIG. 1; 52/646, 638

[56] References Cited

U.S. PATENT DOCUMENTS

| | | |
|---|---|---|
| 3,220,152 | 11/1965 | Sturm . |
| 3,725,946 | 4/1973 | Quequen ............... 343/912 |
| 3,913,105 | 10/1975 | Williamson et al. ......... 343/915 X |
| 3,986,434 | 10/1976 | Kohler . |
| 4,256,088 | 3/1981 | Vindum ............... 343/882 X |
| 4,337,560 | 7/1982 | Slysh ............... 343/915 X |
| 4,558,551 | 12/1985 | Sevelinge et al. . |
| 4,650,361 | 3/1987 | Seuster . |
| 5,228,258 | 7/1993 | Onoda et al. ............... 343/915 X |

FOREIGN PATENT DOCUMENTS

| | | |
|---|---|---|
| 1776170 | 1/1972 | Australia . |
| 0226160 | 6/1987 | European Pat. Off. . |
| 2293614 | 7/1976 | France . |
| 2453297 | 10/1980 | France . |
| 2530745 | 1/1984 | France . |
| 1599527 | 10/1991 | United Kingdom . |

OTHER PUBLICATIONS

Derwent Soviet Inventions Illustrated, Section 3, Mechanical and General, issued Apr. 1969 Engines, Pumps, Boilers, Refrigerators, p. 13, SU 223553 (NAZININ) 13 Nov. 1968.

*Primary Examiner*—Donald T. Hajec
*Assistant Examiner*—Tho Phan
*Attorney, Agent, or Firm*—Sughrue, Mion, Zinn, Macpeak & Seas, PLLC

[57] ABSTRACT

A dish antenna framework is constructed from tetrahedral strut assemblies. Each assembly is made up of six struts joined at their ends to four nodes. The nodes also constitute dish mounting points for the dish on the dish antenna framework. These points are located on the envelope of the dish. The framework supported on base frame is rotated about the vertical axis using a movable hydraulic ram arrangement wherein a ram cylinder is attached by an arm to the base frame to be rotated, a ram piston is removably attached to anchor members fixed to a platform. Rotation is effected by expanding and contracting the hydraulic ram. The ram is guided between anchor members by guiding means.

10 Claims, 5 Drawing Sheets

DISH ANTENNA STRUCTURES AND HYDRAULIC CONTROL OF THE ORIENTATION THEREOF

TECHNICAL FIELD

This invention concerns rigid structures. It also concerns dish antennas of the type used for radio telescopes, solar collectors, satellite communication, and the like. In particular, this invention concerns structures for supporting the dishes of such, preferably using a novel hydraulic arrangement for the controlled rotation of the dish supporting structure about a vertical axis.

BACKGROUND OF THE INVENTION

Dish-like antennas which are used as, for example, receivers of signals from satellites, solar collectors and radio telescopes, utilise a reflecting dish to focus electro-magnetic radiation upon a receiver. The dish comprises a reflective or conductive surface which is mounted on a rigid frame. The dish, with its supporting frame, is manipulated by one of a number of conventional techniques, discussed below, to point continuously to the object from which the antenna receives electro-magnetic radiation.

In a typical dish antenna, the frame which supports the reflector dish is usually a complex structure. It may be an inverted geodesic dome, or a series of concentric hoops supported by a plurality of identical sub-frames extending radially from below the centre of the dish. Such basic dish support frames are relatively weak structures and quite complex bracing arrangements are required to strengthen them. Even with such bracing, if the dish has a continuous surface (which is usually the case when the dish is used to receive and focus solar radiation), it can distort to a significant extent when the antenna is subjected to moderate wind loads.

A further disadvantage of the existing dish supporting frames is that, unless detailed and time-consuming design procedures are used to produce the support frame design, they are not constructed so that the points (called "mounting points") on the support frame to which the dish surface is attached lie accurately on the envelope of the surface of the dish. Thus, when assembling the antenna structure, and in particular when mounting a large reflecting surface on the dish supporting frame, it is usually necessary to adjust the mounting of each portion of the reflecting surface to form the required surface shape of the dish. The cost of producing the existing dish antennas is thus quite high, partly due to the complex configuration of the supporting frame and partly due to the amount of skilled labour required in the assembly of the antenna structure.

As mentioned above, the distortion of the dish surface under even moderate wind loads is particularly significant in the case of antennas used as solar collectors, which have continuous reflector surfaces and which need to be cost effective. Such antennas must be capable of receiving radiation from the sun even when the sun is at the horizon.

Since a change in the elevation of the line of sight of a dish is effected by movement of the dish and its associated support frame about a horizontal axis which is positioned below the centre of the dish when the dish is pointing directly upwards, the axis of rotation of the dish structure must be at a distance above the ground that is at least half the vertical extent of the dish, measured when the dish has its line of sight directed to the horizon. This horizontal axis of rotation is invariably at the top of a tower. Thus, when the dish is moved so that its line of sight is vertically above this axis, all of the dish surface is positioned well above the ground, where it is fully exposed to the wind. In other than light breezes, the wind loads will distort a reflector dish surface unless the support frame is a complex structure which includes a number of bracing members and the dish is constructed from a strong, and therefore heavy, material (in which case there must be an increase in the handling capabilities of ancillary equipment). If the dish is not made from a heavy, rigid material, it may be necessary to curtail the operation of the antenna in strong winds to avoid the possibility that the dish will be damaged. In either case, an economic penalty is incurred.

A further problem associated with large dish antennas is associated with the rotation of the antenna structure about a vertical axis, which is an integral part of the "tracking" of the antenna to keep its line of sight directed at a particular object (the sun, in the case of a solar collector). Normally, this rotation of the antenna structure is effected using a motor which drives a pinion. The pinion engages with an arcuate or circular toothed track. The motor, which is electrically or hydraulically powered, drives the pinion through a reduction gearbox, so that the antenna is rotated continuously, yet slowly, about a vertical axis. Such electric or hydraulic motors, with their reduction gearboxes, are expensive components. Furthermore, should there be a power failure, provision must be made to "off steer" the antenna rapidly to avoid potential damage to the receiver of electromagnetic radiation. The "off-steering" device requires a back-up power supply to enable it to function in an emergency. The back-up power supply is usually a bank of batteries, which require regular maintenance as well as adding to the capital cost of the antenna installation.

DISCLOSURE OF THE PRESENT INVENTION

It is an object of the present invention to provide a support structure for the dish of a dish antenna which is more rigid than the conventional dish-supporting frame, yet which is also a relatively light-weight construction.

This objective is achieved by the provision of a dish supporting frame which (a) is constructed as a number of strut assemblies, each strut assembly being a tetrahedral arrangement of six rigid struts, the ends of which are connected to four "nodes", or joining points, and (b) has a plurality of dish mounting points to which the dish, or the elements which form the dish, may be attached. The dish mounting points are on the envelope of the dish surface (which will usually be a paraboloidal surface or a surface having the shape of the cap of a sphere—generally termed a "spherical surface").

The use of tetrahedral strut assemblies provides a strong and rigid, yet relatively light-weight, supporting frame for the dish of the antenna. In addition, careful selection of the length of the struts in the various tetrahedral strut assemblies permits the mounting points for the dish, which are at respective nodes of the strut assemblies, to be positioned accurately in any required location. By having the mounting points at the envelope of the dish surface, the dish—or the elements which make up the dish—can be mounted on the support frame without the need for adjustment of the spacing between each mounting point and the dish or dish element. Thus the antenna design can be effected in a laboratory and provided the appropriate number and lengths of struts are supplied to the antenna site, the dish supporting frame can be assembled accurately, in situ, and the dish can be mounted on the frame and the antenna operated immediately.

The present inventors have appreciated that the tetrahedral strut assemblies, used to create a rigid dish support frame for a dish antenna, can also be used to create beams or towers having good torsional stability. Such beams (for example, for use as a crane arm) and towers are formed by a plurality of at least three rod members, interconnected by a plurality of strut assemblies, each strut assembly comprising a tetrahedral assembly of six struts, joined at their ends to four nodes (to some of which the rod members are rigidly connected).

Reverting to the dish antenna realisation of the present invention, it is normal practice to mount the dish support frame on a main frame of the antenna. The mounting of the support frame is effected at a horizontal tilt axis, about which the support frame (and thus the dish) is rotatable. A preferred feature of the present invention is the provision of an elevation tilt axis between the central portion and the outermost ends of the strut assemblies of the dish support frame (that is, at a location beneath the dish of the antenna, intermediate between the centre of the dish and its periphery). With this feature present in the antenna structure, the total height of the antenna when its line of sight is vertical is less than the total height of a conventional dish antenna of the same dish size, arranged with its line of sight vertical. Thus the wind loading on an antenna having this preferred feature is reduced.

In a preferred form of the present invention, the support frame for the dish of a dish antenna is also mounted for rotation about a vertical axis. The preferred mechanism for such rotation of the support frame involves an arm which extends from the vertical axis of rotation of the base frame of the antenna (this arm is rigidly connected to or constitutes a component of the base frame of the antenna, on which the dish supporting frame is mounted) to the cylinder of a double-acting hydraulic ram. The free end of the rod of the hydraulic ram is connected to one of a plurality of anchor members, which are rigidly mounted on the earth or on the platform on which the base frame is mounted. The anchor members are approximately equi-spaced around a circle having its centre at the vertical axis of rotation of the antenna. When the hydraulic ram is contracted, it pulls the end of the arm towards the anchor member to which the end of the ram rod is connected, and thus to rotates the antenna about its vertical axis. At a predetermined point in the contraction of the ram, the contraction ceases, the arm is locked in the position it has reached, and the free end of the ram rod is disconnected from the anchor member. Then the ram is expanded, and the free end of the ram rod is guided to the next anchor member of the circle of anchor members. Upon arrival at the next anchor member, the expansion of the ram is ceased, the free end of the ram rod is connected to the next anchor member, and the antenna arm is unlocked. The ram is then contracted to re-start the movement of the arm, and thus of the antenna, about the vertical axis.

Reversing this sequence will cause the antenna to be slowly rotated about its vertical axis in the opposite direction.

Since the movement of the free end of ram rod can be effected rapidly while the arm is locked, there is no significant interruption of the slow rotational movement of a tracking antenna. In fact, for large antennas used as solar collectors, for which this aspect of the present invention was developed, the dimensions of the components of the solar energy collection arrangement are such that stepwise contraction of the hydraulic ram is normally used to rotate and reposition the antenna structure. This will be explained in more detail later in this specification.

Not only is such a rotational drive mechanism substantially less costly than the conventional drive motor and its assoicated accurately laid track with which the pinion driven by the drive motor engages, but the emergency "back up" arrangement for off-steering the antenna can be the same ram arrangement adapted to be driven by pressurised gas (for example, nitrogen) from a cylinder of the gas.

It will be appreciated that this method for rotating a dish antenna can be used to rotate other bodies.

Thus, according to the present invention there is provided a dish support frame for the dish of a dish antenna, said dish support frame comprising (a) a plurality of strut assemblies, each strut assembly comprising six rigid struts, connected at their ends to four nodes of the support frame to form a tetrahedral strut assembly; and (b) a plurality of dish mounting points, each dish mounting point being at a respective one of the nodes of a strut assembly, said dish mounting points being located on the envelope of the shape of the dish.

As noted above, preferably the dish support frame has a pivotal connection to the base frame of the antenna to permit the elevation of the line of sight of the antenna to be varied, this pivotal connection being at a tilt axis which is located away from the centre of the dish support frame and preferably between the centre of the dish support frame and the periphery of the dish support frame. The tilt axis could be outside the edge of the dish support frame, though it is believed that a tilt axis in such a location will rarely be required.

In a preferred form of the present invention, there is provided a dish support frame for the dish of a dish antenna, as defined above, the support frame being mounted for pivotal movement about a horizontal axis which is displaced laterally from the center of the support frame.

In a further preferred form of the present invention, the dish support frame is mounted for rotation about a vertical axis, using a mechanism comprising (a) an arm attached to or forming part of said body, and extending generally radially from said vertical axis;

(b) a hydraulic ram having a ram cylinder and a ram rod actuated by hydraulic fluid within said ram cylinder, said ram cylinder being connected to said arm;

(c) a plurality of substantially equi-spaced anchor members fixedly mounted on a platform beneath said body, said anchor members lying on a circle, or on an arc of a circle, the centre of said circle being said vertical axis;

(d) means for engaging the end of said ram rod which is remote from said ram cylinder with each of said anchor means;

(e) substantially circular guiding means for guiding said end of said ram rod from one anchor means to another of said anchor means;

(f) locking means for temporarily locking said arm in locations occupied by said arm in its rotational movement about said vertical axis; and (g) hydraulic control means for expanding and contracting said hydraulic ram.

For a better understanding of the present invention, embodiments thereof will now be described, by way of example only, with reference to the accompanying drawings.

BRIEF DESCRIPTION OF THE ACCOMPANYING DRAWINGS

DETAILED DESCRIPTION OF THE ILLUSTRATED EMBODIMENTS

Figure 1:
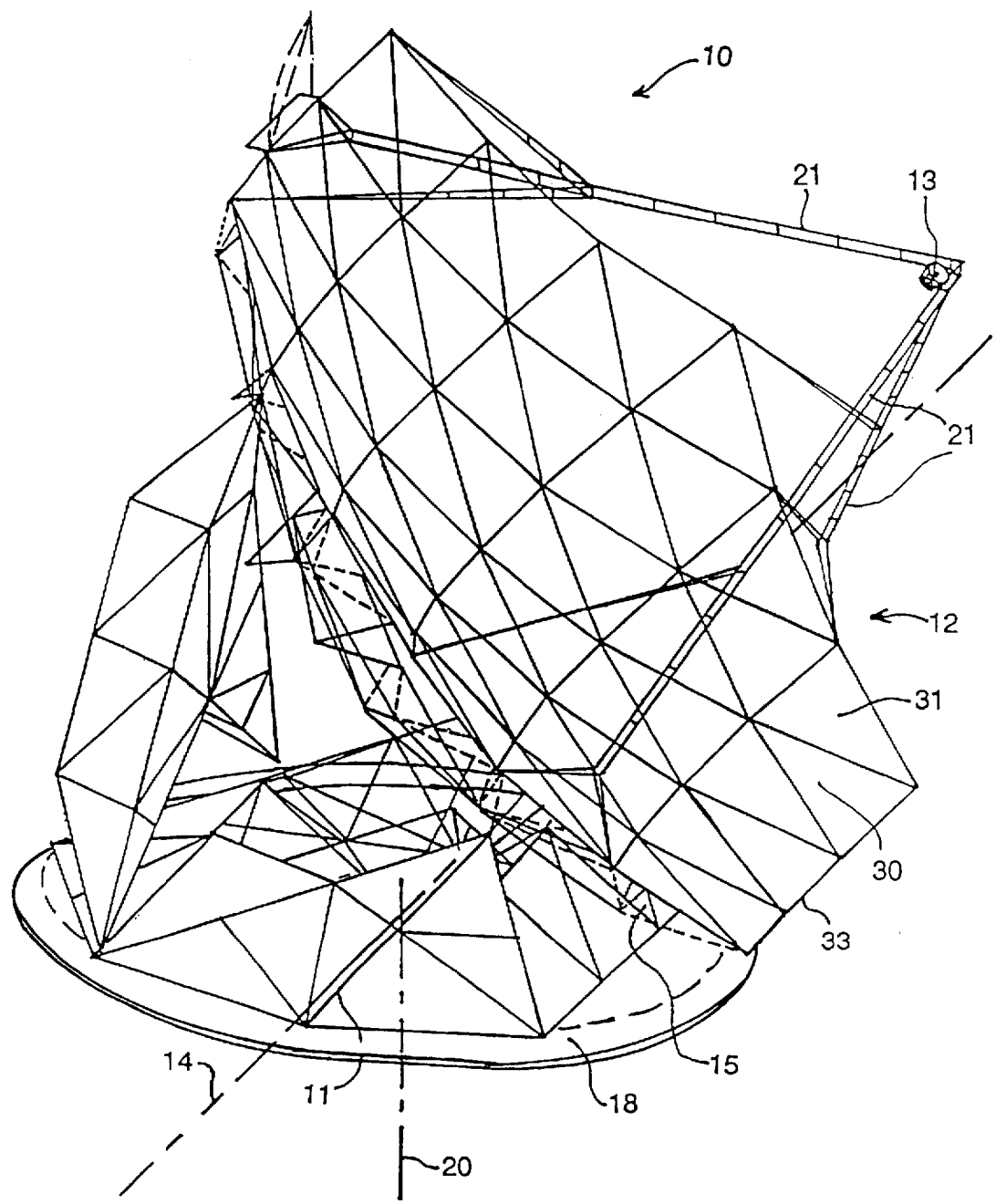
FIG. 1 is a perspective sketch of a dish antenna designed by the present inventors for the collection of solar radiation.
Figure 2:
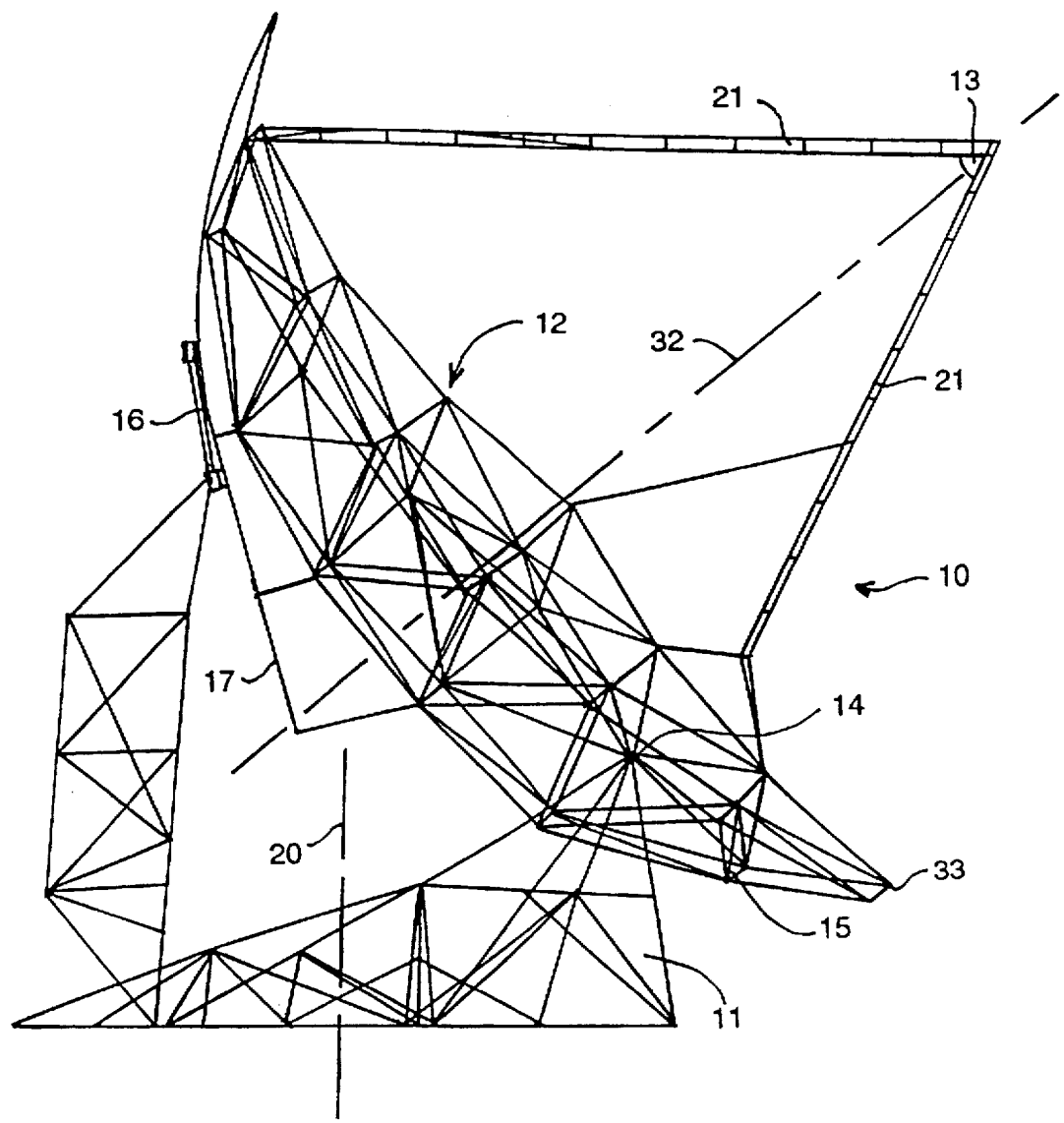
FIG. 2 is a side elevational view of the antenna of FIG. 1.

The dish antenna 10 illustrated in FIGS. 1 and 2 was designed by the present inventors and has been assembled at The Australian National University, in Canberra, Australia. It comprises a dish 12 constructed using a number of reflecting dish segments or panels 31 which are mounted on a dish supporting frame 15. The dish 12 is a spherical reflector having a hexagonal periphery. The shorter edges of the hexagonal periphery are 21.8 meters long and its longer edges are 24.7 meters long. The dish has an aperture of 400 square meters. If this dish should focus the sun (which subtends an angle of about 0.5° at the earth) sharply, the sun's image would have a diameter of approximately 14 cm. Such an image of the sun would create such a concentration of energy at the focus that most materials used in equipment to harness the sun's energy would be damaged. Thus the dish 12 is designed to form a "fuzzy" image of the sun, having an area of about five times the sharply focused image, at its focal region. A "receiver" 13 of the solar energy, which is supported by struts 21, is positioned at the focal region of the dish 12. In the solar collector built by the present inventors, the receiver 13 comprises a coiled tube which is used to generate high quality steam (that is, steam at high pressure and high temperature—although the temperature of the steam is limited by its application, for most steam turbines cannot accept steam at a temperature in excess of 500° C.).

It is emphasised that the embodiment of the present invention featured in FIGS. 1 and 2 is but one example of an implementation of the present invention, and the present invention is not limited to solar energy collectors generally, or to antenna configurations which are similar to that illustrated in FIGS. 1 and 2.

The dish supporting frame 15 is pivotally connected by a horizontal tilt axis 14 to a base frame 11 of the antenna structure. The elevation of the line of sight 32 of the dish antenna is controlled by movement of the dish 12 and its support frame 15 about the tilt axis 14 using a hydraulic ram arrangement 16 which controls the movement of a sub-frame 17 that extends from the dish support frame of the solar collector antenna. However, this tilting arrangement could be substituted by any other suitable drive mechanism, such as a screw drive, a rack and pinion mechanism, or a recirculating ball mechanism).

The base frame 11 of the antenna is mounted for rotation about a vertical axis 20, which is at the centre of a circular track 18. In conventional antennas, the rotation of the main or base frame 11 about the axis 20 would be effected by drive motors, driving pinions which engage a circular track. The solar collector antenna constructed by the present inventors utilises a different form of frame rotating mechanism, constructed in accordance with a second aspect of the present invention.

Figure 3:
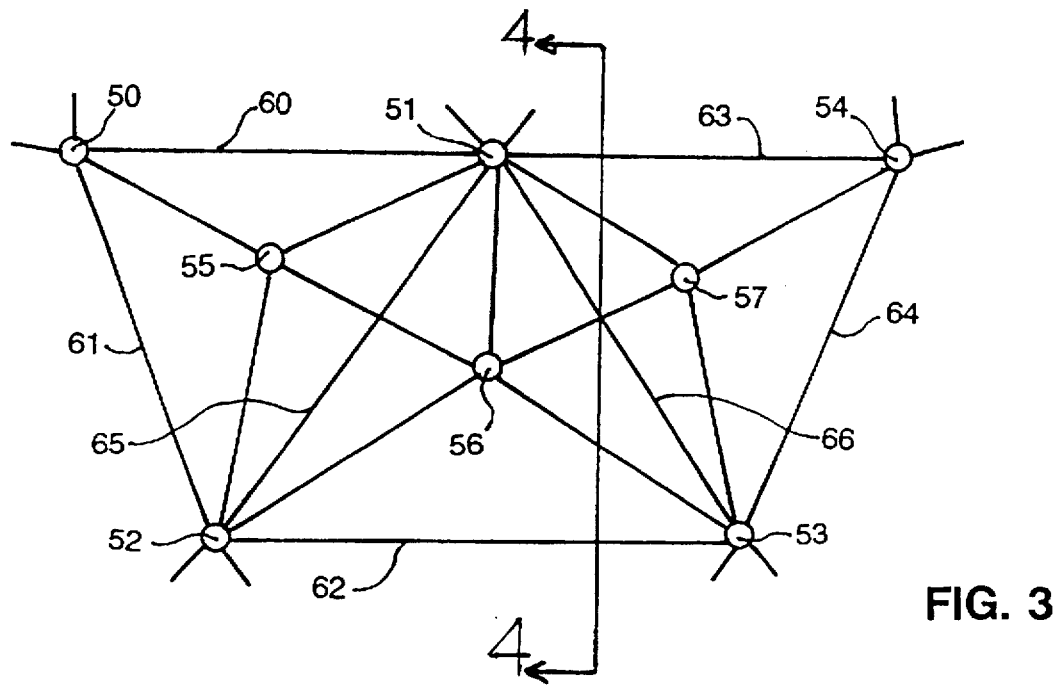
FIG. 3 is a schematic exploded representation of part of the dish support frame of the antenna of FIGS. 1 and 2.

A part of the dish supporting frame 15 is illustrated in FIG. 3. FIG. 3 shows a number of rigid struts, including struts 60, 61, 62, 63, 64, 65 and 66, connected to nodes 50, 51, 52, 53 and 54 of the dish supporting frame. The nodes used by the present inventors are conventional nodes in the form of spherical members on which planar surfaces are formed. The planar surfaces of each node are adapted to receive the ends of struts, which are rigidly attached to the node (for example, using a threaded extension to the strut which is screwed into a threaded bore in the node).

The nodes 50, 51, 52, 53 and 54 of FIG. 3 also constitute mounting points for the dish segments 31. By carefully choosing the lengths of the struts of the dish supporting frame, the frame can be constructed so that those nodes lie on the envelope of the required dish surface, which, in the case of the solar collection antenna of FIGS. 1 and 2, is a paraboloidal surface (which approximates closely to a spherical surface over much of the dish surface).

Figure 4:
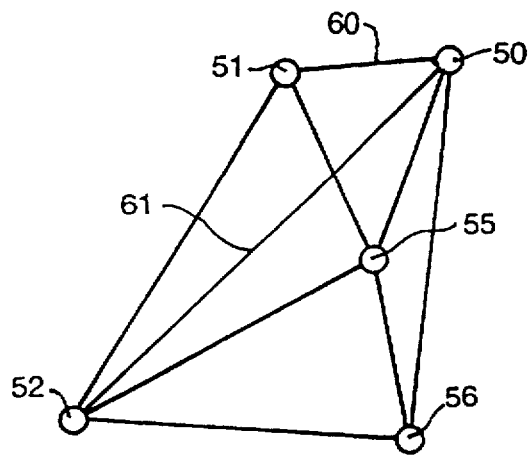
FIG. 4 is a sectional view at 4—4 of FIG. 3.

These nodes are interconnected to other nodes, not shown in FIG. 3. A dish support frame created by struts connected only to the nodes at the envelope of the dish surface would form a weak structure. However, further nodes 55, 56 and 57 are provided away from the dish surface. As shown in FIG. 4, node 55 is connected by struts to nodes 50, 51, 52, 56 and another unshown node. Node 56 is connected by struts to nodes 51, 52, 53, 55 and 57; node 57 is connected by struts to nodes 51, 53, 54, 56 and another unshown node.

Thus nodes 50, 51, 52 and 55 and the struts connecting these nodes form a first tetrahedral strut assembly, and nodes 51, 52, 53 and 56 and the struts connecting these nodes form a second tetrahedral strut assembly. Similarly, nodes 51, 53, 54 and 57 and the struts connecting these nodes define yet another tetrahedral strut assembly. Further tetrahedral strut assemblies are defined by each group of four adjacent nodes. It will be appreciated that these tetrahedral strut assemblies, by virtue of their triangulation in three dimensions and the interlinking of struts between adjacent tetrahedral structures provide an exceptionally strong and rigid structure which can be very light in weight when compared with conventional dish supporting frames and the heavy cross-braces used with such support frames in an attempt to provide rigidity.

It should be noted that the tetrahedral strut assemblies of the dish supporting frame may be joined together with "face contact", "edge contact", "point contact" or any combination of such contact types.

Figure 5:
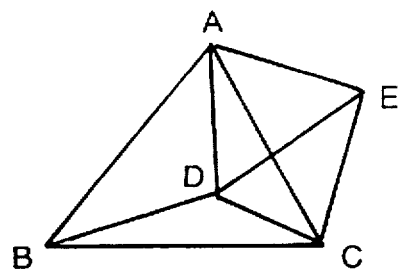
FIGS. 5, 6 and 7 illustrate three alternative adjacent tetrahedral strut assemblies that may be used in implementations of the present invention.

For example, as shown in FIG. 5, ABCD represents a first tetrahedral strut assembly with great inherent rigidity. ACDE represents a second tetrahedral strut assembly having its face ACD connected to face. ACD of the tetrahedral strut assembly ABCD. Note that all nodes A, C, D and E of the tetrahedral strut assembly ACDE are absolutely fixed in relation to each other, and in relation to the tetrahedral ABCD. Thus these strut assemblies will fit together with precision and without requiring adjustment.

Figure 6:
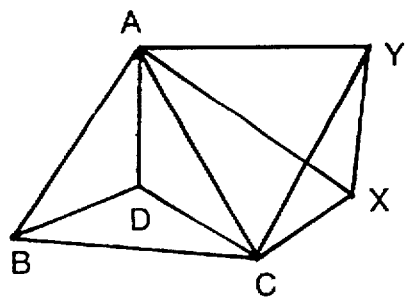

FIG. 6 shows two tetrahedral strut assemblies, ABCD and ACXY, joined in an "edge contact" configuration. It will be noted that there is no member joining nodes D and X. Should such a connecting strut be present, there would be a third tetrahedral strut assembly ACDX in face contact with tetrahedral strut assemblies ABCD and ACXY, on faces ACD and ACX respectively.

Whilst the nodes of each tetrahedral strut assembly are accurately and rigidly located in each assembly, it will be noted that tetrahedral strut assembly ACXY may move relative to strut assembly ABCD by rotation about the line AC. By suitable design, adequate rigidity and precision may be provided which allows for the deletion of strut members, such as DX, with a further saving of cost and weight. It will also be noted that during the construction of the dish supporting frame, some additional (but temporary) support may be needed to locate some of the tetrahedral strut assemblies prior to completion of the frame structure. (This comment also applies to the beam and tower structure realisations of the invention.)

Figure 7:
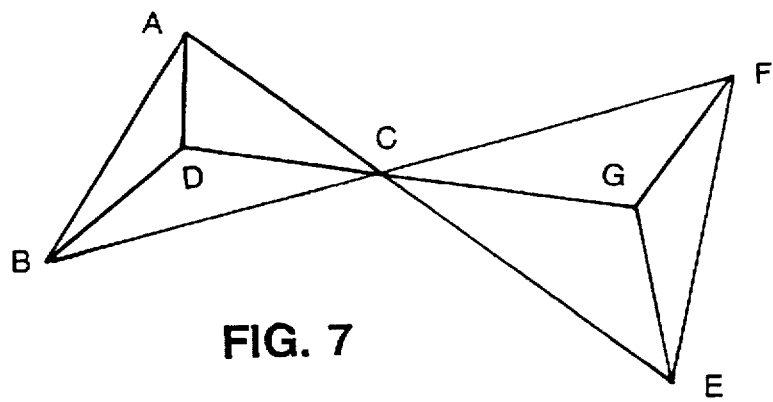

FIG. 7 shows two tetrahedral strut assemblies, ABCD and CEFG, joined together in point contact at node D. The two tetrahedral strut assemblies may rotate relative to each other about node C, but by suitable design, adjacent tetrahedral strut assemblies will fix the relative positions of assemblies ABCD and CEFG, and will provide sufficient rigidity whilst reducing the number of components and weight of the dish support frame. Again some additional, but temporary, support will be required during the assembly of the support frame.

The provision of a dish support frame for a dish antenna using tetrahedral strut assemblies provides the following significant advantages over the conventional frames currently used to support dishes.

1. Stability of the reflecting surface. The space frame of the present invention is extremely rigid. Thus, irrespective of dish orientation or wind loadings, the reflecting surface remains substantially undistorted.

2. Rigidity and strength combined with low mass. The interlinking nature of the frame structure provides high rigidity and strength without excessive mass, thus reducing the size and power requirements for support structures, foundations, and associated operating equipment. This, in turn, allows the economic construction of large aperture collectors.

3. Easy manufacture and assembly. The dish supporting frame may be manufactured utilising existing node system technologies. Once the required dish has been designed, the appropriate nodes and struts may be produced in a factory and transported to the site for in situ assembly of the antenna. Due to the accuracy presently possible with such node systems, the dish support frame, and then the dish and the remainder of the antenna, may be easily assembled on site with low requirements for both labour skills and time. Furthermore, once the support frame is assembled, the positions of the mounting points are sufficiently accurate for the reflecting panels to be secured directly to these nodes, with no on-site adjustment of the dish surface being required.

4. Modularity. Once a dish antenna has been designed, the geometry of the nodes remains unaltered whatever size of dish constructed. Thus different size dishes of the same design may be manufactured merely by altering, by a given factor, the lengths of the struts connecting the nodes, or further "rings" of structural tetrahedral strut assemblies may be added to the dish perimeter.

As noted above, the line of sight of the surface formed by the reflecting panels 31 is indicated by line 32. Conventional dish antennas have their dish support frames mounted for rotation about a horizontal axis which intersects this major axis or line of sight 32, or lies adjacent to it.

The horizontal axis 14 about which the dish support frame of the present invention rotates is displaced a substantial distance from the major axis or line of sight 32. In the embodiment of FIGS. 1 and 2, the axis 14 lies approximately midway between the centre of the surface 30 and its lowest outer edge 33. It will be appreciated that the stresses generated in the dish due to an offset axis of pivoting require a somewhat stronger dish support structure than would be the case with an axis of rotation at approximately the balance point of the dish and its support frame. The use of a dish supporting frame comprising tetrahedral strut assemblies provides such a frame, and allows it to be realised economically.

Positioning the pivot axis 14 away from the centre of the collector dish means that, when aligned at or near the horizon, only about one quarter of the diameter of the collector lies below the axis 14. Thus a lower base frame 11 may be utilised, to provide a further saving in materials and cost.

Offsetting the pivot axis 14 does not reduce the total height of the antenna when the collector dish is tracking near the horizon. Tracking near the horizon, however, occurs early in the morning and late in the afternoon, when winds are usually light, and will have little effect on a large dish with a nearly horizontal line of sight. Stronger winds are usually experienced during the middle of the day, when maximum energy is collected. At this time, the total height of an antenna with an offset pivot axis 14 is reduced substantially and the collector dish remains relatively close to the ground. While this in itself does not effect collector efficiency, the reduction in overall height does reduce the wind loads on the structure when the wind is stronger than a light breeze. This is partly due to the reduction in the area of the antenna structure that is exposed to the wind, and partly due to the normal attenuation of wind near to the ground. One consequence of this is the possibility that the dish supporting frame may be made weaker and the antenna will still be operable in the same maximum wind speeds. However, it is preferable not to reduce the strength of the dish support frame, but have the benefit of the ability of the antenna to be operated in higher wind speeds without the risk that the wind will generate loads on the antenna structure which will damage the structure.

Thus, use of the off-set axis 14 feature of the invention firstly lowers the forces applied to the antenna structure, which allows continued operation in higher wind speeds, and secondly lowers the overall height when the collector is "parked", so that wind loads and potential damage are reduced. The only disadvantage of an off-set horizontal axis is a slightly higher drive energy requirement, which must now support part of the weight of the dish. However, the increased efficiency of operation of a solar collector antenna and the lower costs of construction more than compensate for this.

The other supporting structures used in the antenna illustrated in FIGS. 1 and 2, namely the base frame 11 and the back frame 25, are also constructed using tetrahedral strut assemblies.

The dish support frame (and thus the dish) of the antenna shown in FIGS. 1 and 2 may be rotated about the horizontal tilt axis 14 by any suitable mechanism, but preferably using the hydraulically controlled mechanism 16, which is described in detail in the specification of Australian patent application No PL 5900, filed 17 Nov. 1992. In addition, the entire antenna is rotated about the vertical axis 20, preferably using the "walking ram" mechanism which is described in more detail below, with reference to FIGS. 8, 9 and 10.

Figure 8:
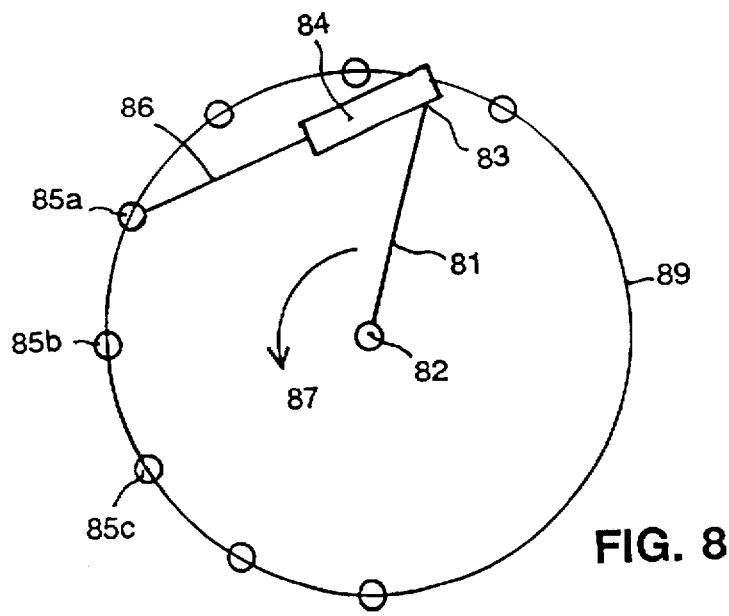
FIGS. 8, 9 and 10 are schematic drawings which illustrate the mechanism and method for rotating the antenna of FIGS. 1 and 2 about a vertical axis.
Figure 9:
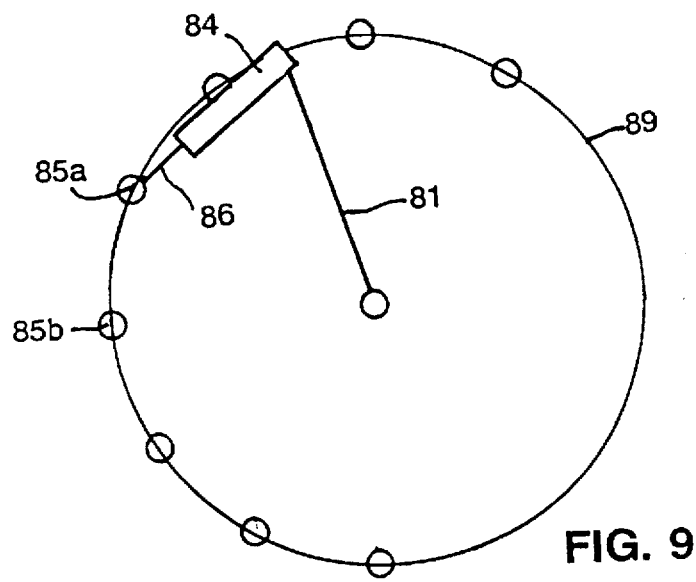
Figure 10:
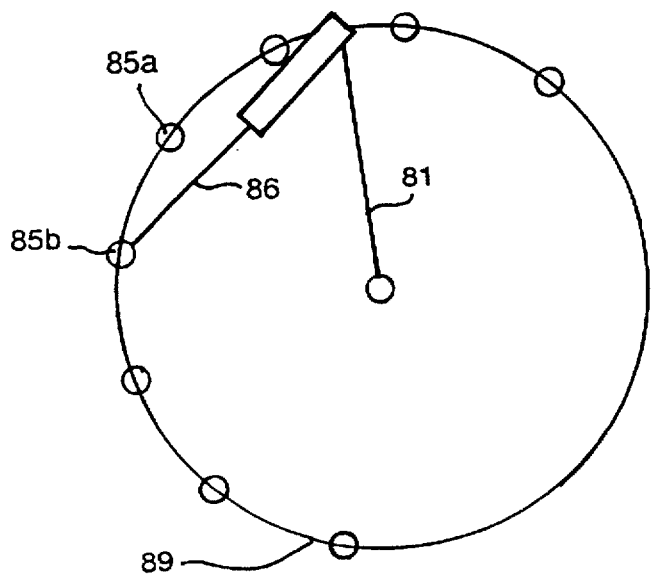

FIGS. 8, 9 and 10 are schematic views, from above, of the preferred arrangement for rotating the base frame 11 of the antenna of FIGS. 1 and 2 about a vertical axis 82. The base frame is provided with an arm 81 which extends generally radially from the axis 82. The arm 81 may be an integral part of the frame. The cylinder 84 of a double acting hydraulic ram is connected to the arm 81 at or near its free end. The hydraulic ram is extended and the free end of the rod 86 of the ram is connected to an anchor member 85a. Anchor member 85a is one of a plurality of anchor members 85a, 85b, 85c, ... which are rigidly mounted on a circle centred at the axis 82. The hydraulic ram is contracted, and the action of moving the ram rod 86 into the ram cylinder 84 pulls the end of the arm 81 towards the anchor member 85a. Thus the frame which the arm 81 is attached (or of which the arm 81 forms a part) is rotated in the direction of arrow 87 about the vertical axis 82.

At a predetermined contraction of the hydraulic ram, shown in FIG. 9, the contraction of the ram ceases. At this point, the arm 81 is locked in its location and the end of the ram rod 86 which has been connected to the anchor member 85a is released from that anchor member. In some instances, it may not be necessary to lock or clamp the arm 81 in its location when the contraction of the ram ceases. The locking of the arm 81 is necessary when a large dish antenna is being rotated because wind forces on the antenna dish and its supporting structure may cause the antenna to rotate in the opposite direction to arrow 87.

The hydraulic ram is then expanded. This expansion causes the end of the ram rod 86 to move along a generally circular guide 89 until it reaches a predetermined degree of expansion, shown in FIG. 10, which occurs when the free end of the ram rod reaches the next anchor member 85b. At this point, the ram rod is connected to the anchor member 85b, the arm 81 is unlocked, and the contraction of the hydraulic ram begins again, to continue the rotation of the arm 81 in the direction of arrow 87.

When the body to be rotated by this mechanism is a large dish antenna of the type illustrated on FIGS. 1 and 2, the "receiver" upon which the light from the sun is focused is larger than the sun's "fuzzy" image. Typically the image of the sun remains within the receiver's target zone for about 20 seconds, so that it is only necessary to adjust the position of the collector every 20 seconds or so, when the image is about to leave the receiver target zone.

Using the arrangement illustrated in FIGS. 8, 9 and 10, it has been found that it is convenient to contract the hydraulic ram in steps, every 15 seconds. This is easily achieved by controlling the volume of fluid in each chamber of the hydraulic ram and does not require any feedback arrangement; the control of the position of the antenna's collector is achieved by merely controlling the amount of fluid pumped by a hydraulic motor. Furthermore, although the rotation of the arm 81 in the direction of arrow 87 is a very slow rotation, when the end of the ram rod has to be moved from one anchor member to the next anchor member, the ram can be driven at a relatively high speed, such that the time from reaching the end of travel and being disconnected from one anchor member to the time of being connected to the adjacent anchor member and commencing the next contraction of the ram is only about 15 seconds. Thus the time taken in moving the ram rod from one anchor member to the next does not result in the sun's image leaving the receiver. A further advantage of this rapid movement is that, if necessary, the ram can off-steer the collector by a substantial amount by engaging an anchor then fully contracting in one operation instead of in steps.

In practical implementations of the arrangement depicted in FIGS. 8, 9 and 10 (for rotation of the base frame about a vertical axis), the anchor members are approximately equi-spaced and secured to a circular concrete track. Each anchor member typically comprises a stanchion with a plate-like member at the top of the stanchion, extending radially inwards. A hole or aperture in the plate-like member is adapted to receive a draw pin which is mounted for vertical movement at the end of the ram rod 86. When the draw pin and the aperture are aligned, movement of the draw pin into the aperture secures the end of the ram rod to the anchor member. The draw pin assembly is mounted on a roller structure which carries the end of the ram rod 86 when the ram is expanding and the end of the ram rod is being moved from one anchor member to the next. A guide mechanism is required to guide the roller structure and ensure that the draw pin and the aperture in the plate-like member become aligned.

The operation of the base frame rotating mechanisms which have been built by one of the present inventors, for the solar collector dish antenna featured in FIGS. 1 and 2, are controlled by a programmed microprocessor, which ensures that the line of sight of the collector dish of the antenna automatically tracks the sun each day.

Skilled engineers will appreciate that the embodiments of the present invention which are illustrated in the accompanying drawings and described above are examples only of realisations of the present invention, and that the invention is not limited to those embodiments.

We claim:

1. A dish support frame for the dish of a dish antenna, said dish support frame comprising:
   (a) a plurality of strut assemblies, each strut assembly comprising six rigid struts, said struts having ends connected to four nodes of the support frame to form a tetrahedral strut assembly; and
   (b) a plurality of dish mounting points, each dish mounting point being at a respective one of the nodes of a strut assembly, said dish mounting points being located on the envelope of the shape of the dish;

said dish support frame further including a mechanism for rotating said support frame about a vertical axis, said mechanism comprising:
   (a) an arm attached to or forming part of said support frame, said arm extending generally radially from said vertical axis;
   (b) a hydraulic ram having a ram cylinder and a ram rod actuated by hydraulic fluid within said ram cylinder, said ram cylinder being connected to said arm;
   (c) a plurality of equi-spaced anchor members fixedly mounted on a platform beneath said support frame, said anchor members lying on a circle, or on an arc of a circle, said vertical axis passing through the centre of said circle;
   (d) means for temporarily engaging the end of said ram rod which is remote from said ram cylinder with a selected one of said anchor members;
   (e) substantially circular guiding means for guiding said end of said ram rod from said selected anchor member to an adjacent anchor member;
   (f) locking means for temporarily locking said arm in locations occupied by said arm in its rotational movement about said vertical axis; and
   (g) hydraulic control means for expanding and contracting said hydraulic ram.

2. A dish support frame as defined in claim 1, in which the strut assemblies of at least one pair of adjacent tetrahedral strut assemblies have three struts and three nodes in common, whereby said at least one pair of strut assemblies are joined together by face contact of their adjacent tetrahedral structures.

3. A dish support frame as defined in claim 1, in which the strut assemblies of at least one pair of adjacent strut assemblies have two nodes and one strut in common, whereby said at least one pair of strut assemblies are joined together by edge contact of their adjacent tetrahedral structures.

4. A dish support frame as defined in claim 1, in which the strut assemblies of at least one pair of adjacent strut assemblies have one node in common, whereby said at least one pair of strut assemblies are joined together by point contact of their adjacent tetrahedral structures.

5. A dish support frame as defined in claim 1, mounted on a base frame of the antenna for pivotal movement about a horizontal axis, said axis being displaced laterally from the centre of the dish support frame.

6. A dish support frame as defined in claim 5, in which said axis is located approximately mid-way between the centre of the dish support frame and the edge region of the dish support frame.

7. A dish support frame as defined in claim 5, including a reflecting dish for directing solar energy to a receiver which is mounted at the focal region of said reflecting dish, said reflecting dish being mounted on said support frame.

8. A dish support frame as defined in claim 1, in which
 (1) said platform is the earth or concrete pad mounted on the earth;
 (2) each of said anchor members is a stanchion affixed to said platform, said stanchion having a plate member extending radially inwards with relation to said circle;
 (3) said end of said arm is supported by a carrier adapted to move over the surface of said platform; and
 (4) said means for temporarily engaging said end of said ram rod to an anchor member comprises means for temporarily connecting said end of said arm to said plate member.

9. A dish support frame as defined in claim 1, including a programmed microprocessor for controlling the operation of said mechanism.

10. A dish support frame as defined in claim 1, including a reflecting dish for directing solar energy to a receiver which is mounted at the focal region of said reflecting dish, said reflecting dish being mounted on said support frame.

* * * * *